United States Patent [19]
Ueda et al.

[11] Patent Number: 5,143,448

[45] Date of Patent: Sep. 1, 1992

[54] TWO-SHAFT CONTINUOUS MIXING APPARATUS

[75] Inventors: Hiroshi Ueda; Kazuyoshi Imuta; Hirofumi Kimura; Naoyuki Tashiro, all of Kobe; Syouji Yasuda, Amagasaki, all of Japan

[73] Assignee: Kabushiki Kaisha Kobe Seiko Sho, Kobe, Japan

[21] Appl. No.: 735,630

[22] Filed: Jul. 22, 1991

[51] Int. Cl.$^5$ .......................... B28C 7/16; A21C 1/06; A21C 1/00

[52] U.S. Cl. ....................... 366/77; 366/84; 366/97

[58] Field of Search ................ 366/77, 79, 83, 84, 366/85, 86, 96, 98, 97, 99, 195, 196, 292, 300, 301; 425/204, 208, 209

[56] References Cited

U.S. PATENT DOCUMENTS

| | | | |
|---|---|---|---|
| 3,216,375 | 11/1965 | Ernst | 366/301 |
| 3,778,032 | 12/1973 | Milling | 366/301 |
| 4,372,002 | 2/1983 | Small | 366/300 |
| 4,411,532 | 10/1983 | Valsamis | 366/99 |

FOREIGN PATENT DOCUMENTS

| | | | |
|---|---|---|---|
| 2657432 | 12/1975 | Fed. Rep. of Germany | 425/208 |
| 2030007 | 8/1985 | Japan | 425/204 |
| 3028609 | 7/1986 | Japan | 366/79 |

Primary Examiner—Harvey C. Hornsby
Assistant Examiner—Terrance R. Till
Attorney, Agent, or Firm—Oblon, Spivak, McClelland, Maier & Neustadt

[57] ABSTRACT

A two-shaft continuous mixing apparatus includes a housing containing two rotors having substantially horizontally aligned centerlines and a material passage formed so as to communicate with a mixing chamber in which the rotors rotate, the material passage extending nearly horizontally from a discharge port of the mixing chamber. The material passage has an upper surface forming an edge with the mixing chamber, and a lower surface forming an edge with the mixing chamber. The material is thereby scraped off the edges and flows through the material passage as the rotors are rotated.

4 Claims, 4 Drawing Sheets

TWO-SHAFT CONTINUOUS MIXING APPARATUS

BACKGROUND OF THE INVENTION

1. Field of the Invention

This invention relates to a two-shaft continuous mixing apparatus.

2. Description of the Prior Art

In the above-mentioned two-shaft continuous mixing apparatus, it is generally customary that a discharge control device (a gear pump) for discharging materials to be mixed is connected outside of the mixed material discharge port provided on one end in the longitudinal direction of a housing, and further a pelletizer is installed on the discharge side of the apparatus. That is, apparatus for forming the mixed materials such as plastics and rubber materials are consecutively arranged.

In this case, the following types of two-shaft continuous mixing apparatus are known, which vary mainly with the way of setting the positional relationship of the housing and the gear pump.

First, the apparatus of the type shown in FIG. 5 is a so-called downward discharge type. In this drawing, a numeral 20 refers to a housing of the mixing apparatus. In a mixing chamber 21 defined within this housing 20 are rotatably installed two rotors 22 and 23 arranged in a horizontal direction. A numeral 24 denotes a gear pump, which is directly coupled with the housing 20 immediately below a discharge port 25, and mounted on the floor 26 of a second floor. A numeral 27 designates a pelletizer, which is installed on the floor 28 of a first floor and connected with the discharge side of the gear pump 24 by means of a transfer pipeline 29 (Japanese Patent Publication No. 56-3091).

Next, FIG. 6 shows a lateral discharge type two-shaft continuous mixing apparatus all set up on the floor 28 of the first floor, in which the housing 20 of the downward discharge type described above is installed with the rotors vertically arranged. On the side of the housing 20 the gear pump 24 and the pelletizer 27 are connected sidewise.

Finally, FIG. 7 shows the two-shaft continuous mixing apparatus of an inclined lateral discharge type according to the present invention, which is of an inclined lateral discharge type. As is shown in this drawing, the housing 20 is inclined by about 45 degrees and the gear pump 24 and the pelletizer 27 connected to the housing 20 are both coupled in juxtaposition with each other similarly to the above-described lateral discharge type (Specification and drawings in Japanese Patent Application No. 61-172096).

These prior arts have made a progress in order of mention.

For example, the above-described downward discharge type required a large-size plant due to an increase particularly in machine height. This problem has been solved by the use of the lateral discharge type in which the housing 20 is vertically arranged. This lateral discharge type, however, still had such a disadvantage as a lowered feed capacity of the rotors 22 and 23 and a non-uniform material temperature within the mixing chamber 21 caused by the adoption of the vertical arrangement of the housing 20. Both the above-described problems and disadvantages have been simultaneously solved by the adoption of the inclined lateral discharge type without accompanying an increase in the plant size.

In the inclined lateral discharge type, however, the housing 20, being inclined 45 degrees as shown in FIG. 7, has become complicated in construction and consequently costly. Further, a facility for replacing the rotors 22 and 23 requires troublesome maintenance work.

Furthermore, the twin rotors 22 and 23 are desired to be horizontally arranged in order to perform mixing operation most satisfactorily. In this respect, therefore, the above-described types of mixing apparatus can not fully obviate these problems and disadvantages.

SUMMARY OF THE INVENTION

This invention has been accomplished in an attempt to solve all these problems mentioned above, and has as its object the provision of a two-shaft continuous mixing apparatus with the horizontal arrangement of the rotors unchanged and capable of smooth lateral discharge of mixed materials.

In the following, technological means incorporated in this invention for the purpose of accomplishing the aforementioned object are described.

In the two-shaft continuous mixing apparatus according to the present invention, two substantially horizontally aligned right and left rotors 3 and 4 for mixing materials and conveying a mixture in a fixed direction are installed in the mixing chamber 2 defined in the housing 1 having the material feed opening and discharge port. These rotors are rotatable in opposite inward and downward directions S. Outside of the discharge port 5 is connected the mixed material discharge control device 24. The discharge port 5 opens in one side 7 of the housing 1. A material passage 8 extends nearly horizontally from the discharge port 5, communicating with a lower half part of the mixing chamber 2. The upper surface 9 of this passage 8 communicates with the mixing chamber 2 within a range below the vicinity of the horizontal centerline $l_1$ of the rotors 3 and 4 and above the lower end 11 of the mixing chamber 2. The lower surface 10 of the material passage 8 is open beneath the right rotor 4 and on the right near the vertical centerline $l_3$ of the rotor 4.

In this invention, as shown in FIG. 1, the mixed material discharge port 5 is provided in one side 7 of the housing 1. The material passage 8 extends nearly horizontally from the discharge port 5, communicating with the mixing chamber 2, and the upper part of the passage 8 is arranged overlapping nearly the lower half part of the mixing chamber 2.

In this case, when the right and left rotors 3 and 4 are turned in opposite inward and downward directions S, the mixture is scraped off from the upper edge 12 and the lower edge 15 formed as intersections between the upper surface 9 and the lower surface 10 of the material passage 8 and the mixing chamber 2 as shown in FIGS. 2 and 3. Thus there takes place fluid flow in the direction of the arrow U, along which the mixed material flows out in the material passage 8 towards the discharge port 5.

The foregoing object and other objects of the two-shaft continuous mixing apparatus according to this invention will become more apparent and understandable from the following detailed description thereof, when read in connection with the accompanying drawings.

BRIEF DESCRIPTION OF THE DRAWINGS

FIGS. 1 to 3 show one embodiment of the present invention, wherein:

FIG. 1 is a longitudinal sectional view of the discharge side of a housing;

FIGS. 2 and 3 are longitudinal sectional views of a major portion thereof;

DESCRIPTION OF PREFERRED EMBODIMENT

Hereinafter an exemplary embodiment of a two-shaft continuous mixing apparatus according to the present invention will be particularly described with reference to the accompanying drawings.

Figure 1:
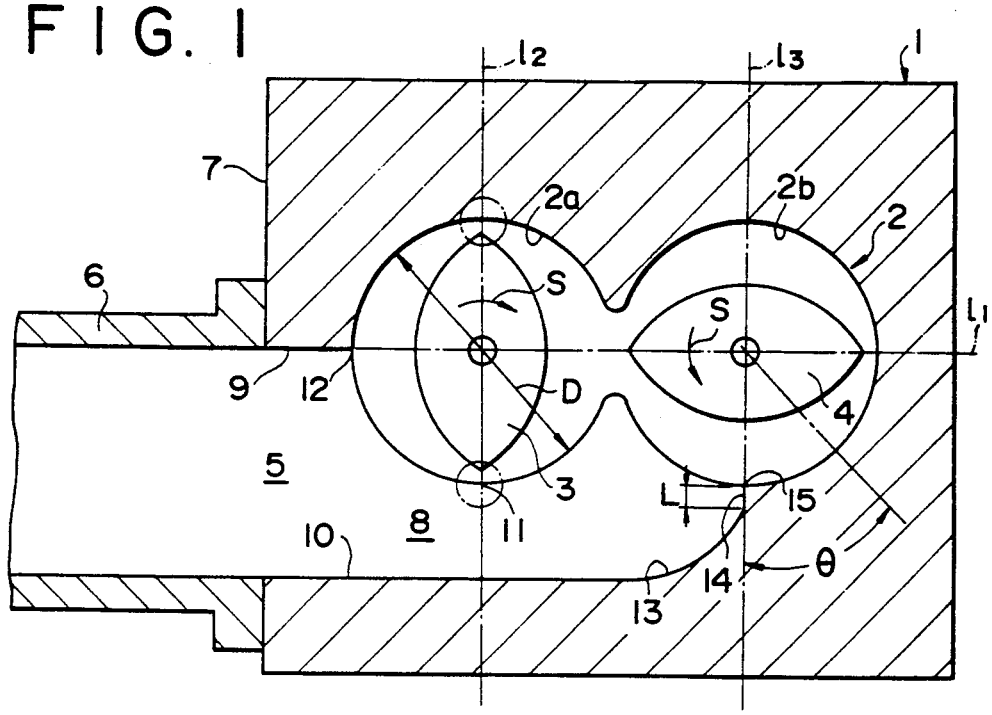

In FIG. 1, a numeral 1 refers to a housing of the two-shaft continuous mixing apparatus, within which is defined a mixing chamber 2 of a spectacles-shaped section. In right and left chambers 2a and 2b of this mixing chamber 2 are rotatably inserted two rotors 3 and 4 in a horizontal direction.

The rotors 3 and 4 have a feed section consisting of axially and longitudinally arranged screw blades and a mixing section consisting of a mixing blade. These rotors 3 and 4 rotate in the opposite inward and downward directions (in the directions of the arrows S in FIG. 1), mixing materials in the mixing chamber 2 and then conveying a mixture in a fixed direction.

In one axial end of the housing 1 is provided a feed opening, which is not illustrated, for feeding materials to be mixed, opening upwardly. In the other end is provided a discharge port 5 for discharging the mixed materials. A numeral 6 denotes a casing of a gear pump directly connected to the discharge port 5, or an auxiliary passage for connection with the gear pump.

In the present embodiment, the discharge port 5 is formed in one side 7 of the housing 1 and the material passage 8 for discharging a mixture from the mixing chamber 2 is formed extending horizontally from the discharge port 5 so as to overlappingly communicate with the lower part of the mixing chamber 2.

This material passage 8 is routed so that an upper half part thereof will overlap a lower half part of the mixing chamber 2. The height position of the upper surface 9 is positioned on the horizontal centerline $l_1$ of the rotors 3 and 4, and the lower surface 10 is set so as to be positioned lower than the lower end 11 of the mixing chamber 2.

There is formed an upper edge 12 as an intersection between the upper surface 9 of the material passage 8 and the left chamber 2a. The lower surface 10 begins to rise between vertical centerlines $l_2$ and $l_3$ of the right and left rotors 3 and 4 and reaches the lower end of the right chamber 2b through a curved section 13 and a perpendicular section 14, thus forming a lower edge 15 as an intersection between the perpendicular section 14 and the right chamber 2b.

In the present invention, this lower edge 15 is positioned on the vertical centerline $l_3$ of the right rotor 4.

Next, conveyance of materials to be mixed and its operation effect in the present embodiment of the above-described constitution will be explained.

First, the materials to be mixed conveyed with a pressure from the feed section of the rotors 3 and 4 come to the material passage 8 while being mixed in the mixing section, dropping into the passage 8.

Figure 2:
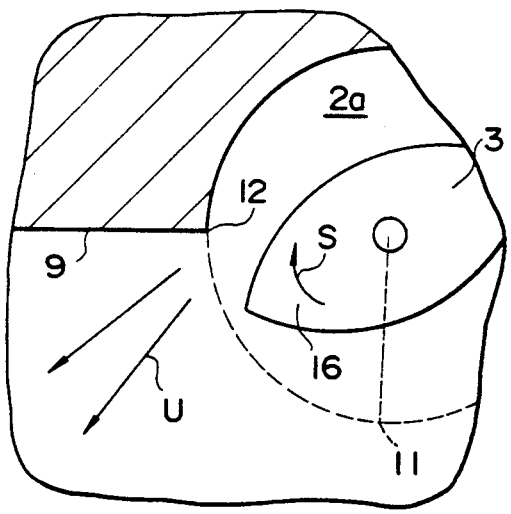
Figure 3:
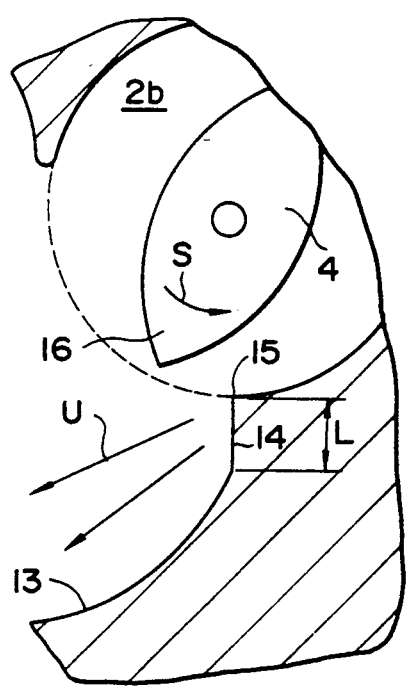

Then, as shown in FIGS. 2 and 3, as the right and left rotors 3 and 4 rotate in specific directions S, the mixing blades 16 of the rotors 3 and 4 approach the edges 12 and 15 respectively every rotation. At this time the mixed materials are scraped off by the edges 12 and 15, being conveyed, as a fluid flow (scraping effect), in the direction of the arrow U in the drawing, to the casing 6 side through the discharge port 5.

According to the present embodiment, the housing 1, unlike the prior-art housing, can smoothly discharge the mixed materials laterally towards the housing 1 side by the rotating force of the rotors 3 and 4 themselves without inclining the housing 1. Therefore, it is possible to set such equipment as the gear pump and others in juxtaposition on the side of the discharge side of the housing 1 while maintaining the horizontal arrangement of the right and left rotors 3 and 4 which is the optimum condition for the mixing apparatus, thereby simultaneously realizing the sound mixing of materials by means of the mixing apparatus and the adoption of a compact housing 1 by decreasing machine height on the discharge side.

The material passage 8 in the present embodiment extends horizontally from the discharge port 5 to communicate with the mixing chamber 2, overlapping the chamber 2 from below. The height of the housing 1, therefore, can be decreased as low as possible despite the presence of the passage 8 in the housing 1 itself.

In the foregoing explanations of the present invention, one preferred embodiment has been described in detail, but it should be noted that this invention is not limited to the above-described and that the shape of the material passage in the mixing apparatus according to this invention and the state of flow of mixed materials according to the shape will vary with variations in the relative positions of the upper and lower edges 12 and 15 relative to the right and left chambers 2a and 2b, and in the height L of the vertical section 14.

First, to explain the positional relation between the upper edge 12 and the left chamber 2a, the height of the upper edge 12 is allowed to be below the upper edge of the left chamber 2a and above the lower edge, provided that the material passage 8 according to the present invention overlapping the mixing chamber 2 is sufficient. To attain a substantial scraping effect of the edge 12, however, it is desirable that the height position of the upper edge 12 be below the lower half of the left chamber 2a, that is, below the vicinity of the horizontal centerline $l_1$ of the rotors 3 and 4 and above the lower edge 11 of the left chamber 2a.

Next, the position of the lower edge 14 in relation to the right chamber 2b will be explained.

Here, as shown in FIG. 1, it is clear from experiments that the position of the lower edge 15 is preferred to be within the range of $0° \leq \theta \leq 45°$ where $0°$ corresponds to the position vertically below the right rotor 4 on the centerline $l_3$ and 45° is spaced from 0° in the direction of rotation or rotor 4. That is, if the center angle $\theta$ becomes greater than 45 degrees, the direction of flow of the mixed materials caused by the scraping effect of the lower edge 15 described above will fail to agree with the desired direction of discharge of the mixed materials, resulting in an excess discharge resistance.

Furthermore, as regards the height L of the vertical section 14, it is clear from experiments that when the right and left chambers 2a and 2b have the diameter D, the height D is applicable within the range of $0.05D \leq L \leq 0.4D$, and that the optimum value, therefore, is obtainable when $L = 0.15D$. That is, when $L > 0.4D$, the height of the material passage 8 accordingly increases excessively high, resulting in excessive exhaust resistance of the mixed materials. Reversely when $L < 0.05D$, the aforementioned scraping effect becomes excessively little.

Figure 4:
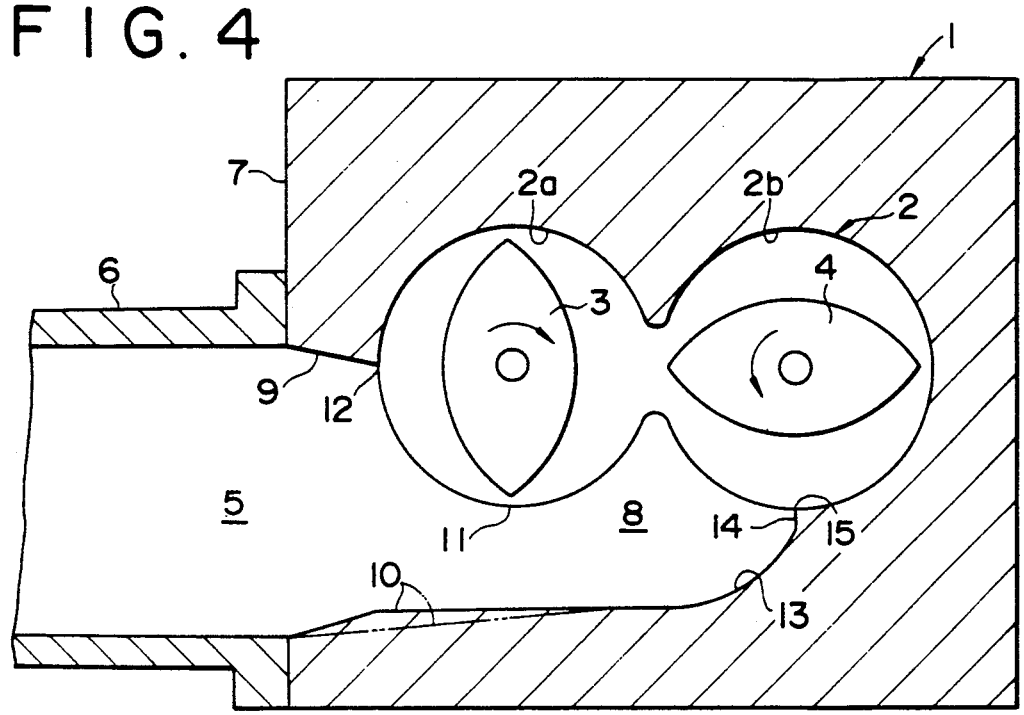
FIG. 4 is a longitudinal sectional view of the discharge side of the housing showing an example of a variation of a material passage.
Figure 5:
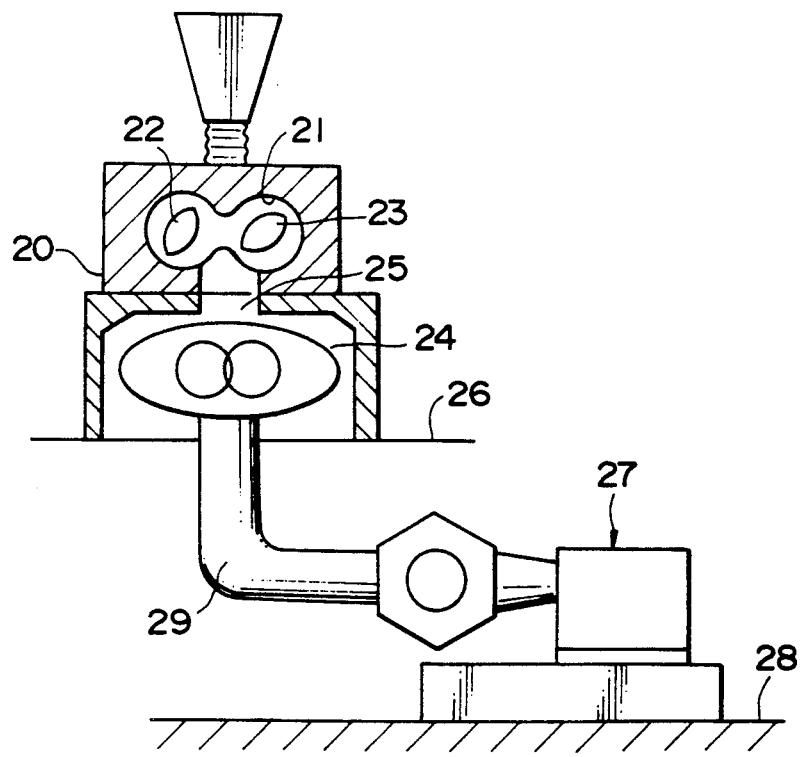
FIGS. 5 to 7 are schematic explanatory views each showing an example of each type of prior-art equipment for forming materials to be mixed.
Figure 6:
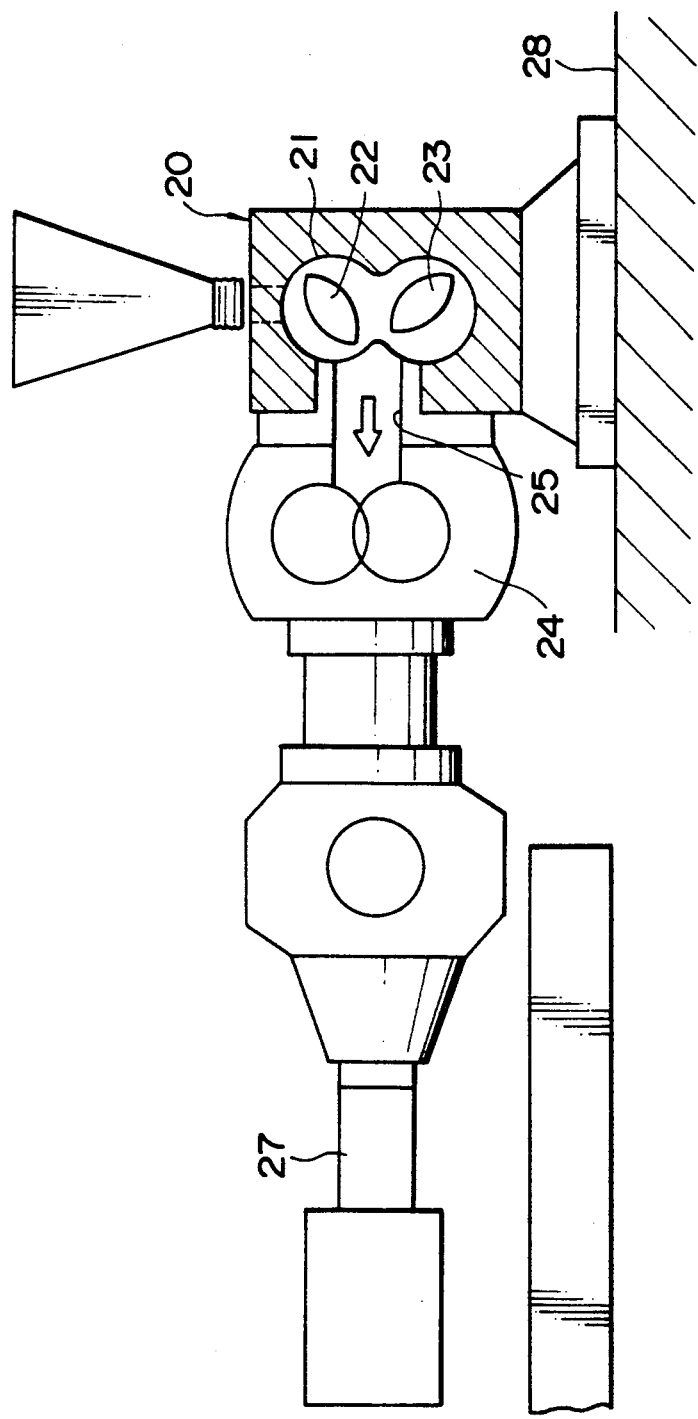
Figure 7:
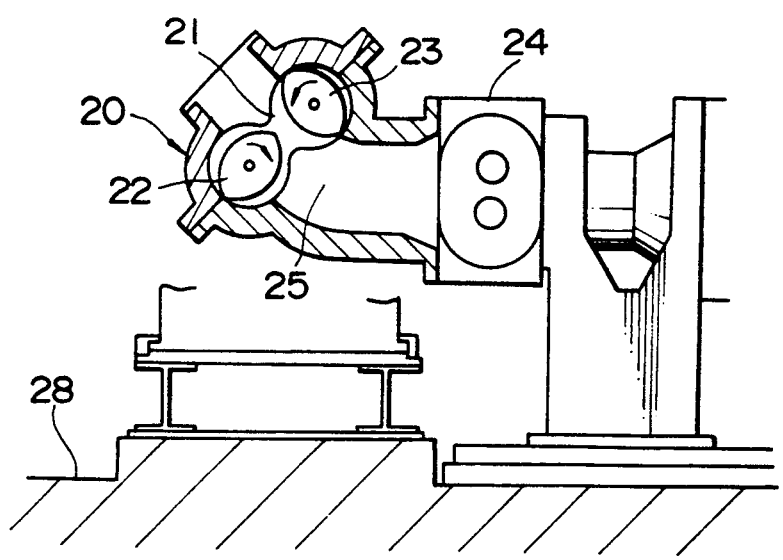

The upper surface 9 and the lower surface 10 which form the material passage 8 are not necessarily required to be held strictly level as in the above-described embodiment, and, for example, as shown in FIG. 4, may be inclined towards the discharge port 5 for the purpose of decreasing the discharge resistance of the mixed materials.

According to this invention, as described above, it is possible to smoothly discharge the mixed materials towards the housing 1 side without inclining or erecting the housing 1, that is, without changing the horizontal arrangement of the rotors 3 and 4, and therefore it is possible to insure sound mixing of materials by the mixing apparatus and also to decrease the machine height on the discharge side of the housing without lowering the feeding capacity of the rotors 3 and 4 and causing any non-uniform material temperature within the mixing chamber 2.

The material passage 8 extending from the discharge port 5 in a horizontal direction, communicates with the mixing chamber 2, and the upper part of the passage 8 is so arranged as to overlap the lower half part of the mixing chamber 2. It is, therefore, possible to decrease the height of the housing 1 itself, thereby enabling further reduction of machine height as compared with the prior-art lateral discharge type and the inclined lateral discharge type.

While only one embodiment of this invention has been described, it will be apparent to those skilled in the art that various changes and modifications may be made therein without departing from the spirit and scope of this invention as claimed.

What is claimed is:

1. A two-shaft continuous mixing apparatus, comprising:
    a housing having a feed opening at one end for feeding materials to be mixed;
    a discharge port provided in another end of said housing, on one side of said housing;
    two rotors rotatably mounted in a mixing chamber formed in said housing and having substantially horizontally aligned centerlines;
    a discharge control device connected outside of said discharge port for controlling the discharge of mixed materials;
    a material passage formed so as to communicate with said mixing chamber and extending nearly horizontally from said discharge port;
    said material passage having an upper surface positioned no higher than the horizontal centerlines of said rotors and above a lower end of said mixing chamber and forming an edge with said mixing chamber, and a lower surface of said material passage extending to a longitudinal centerline of the rotor furthest from said discharge port and forming another edge with said mixing chamber adjacent said longitudinal centerline, wherein the material is scraped off said edges and flows through said discharge port as said rotors are rotated.

2. A two-shaft continuous mixing apparatus as claimed in claim 1, wherein the lower surface of said material passage is connected with said mixing chamber located on the opposite side of said discharge port through a curved section and a vertical section.

3. A two-shaft continuous mixing apparatus as claimed in claim 2, wherein a height of said vertical section is within the range of 0.05 D to 0.4 D where D denotes the diameter of said mixing chamber.

4. A two-shaft continuous mixing apparatus as claimed in claim 1, wherein said another edge is positioned within a range of 0 to 45 degrees from a vertical centerline of said rotor farthest from said discharge port.

* * * * *